Patented July 12, 1932

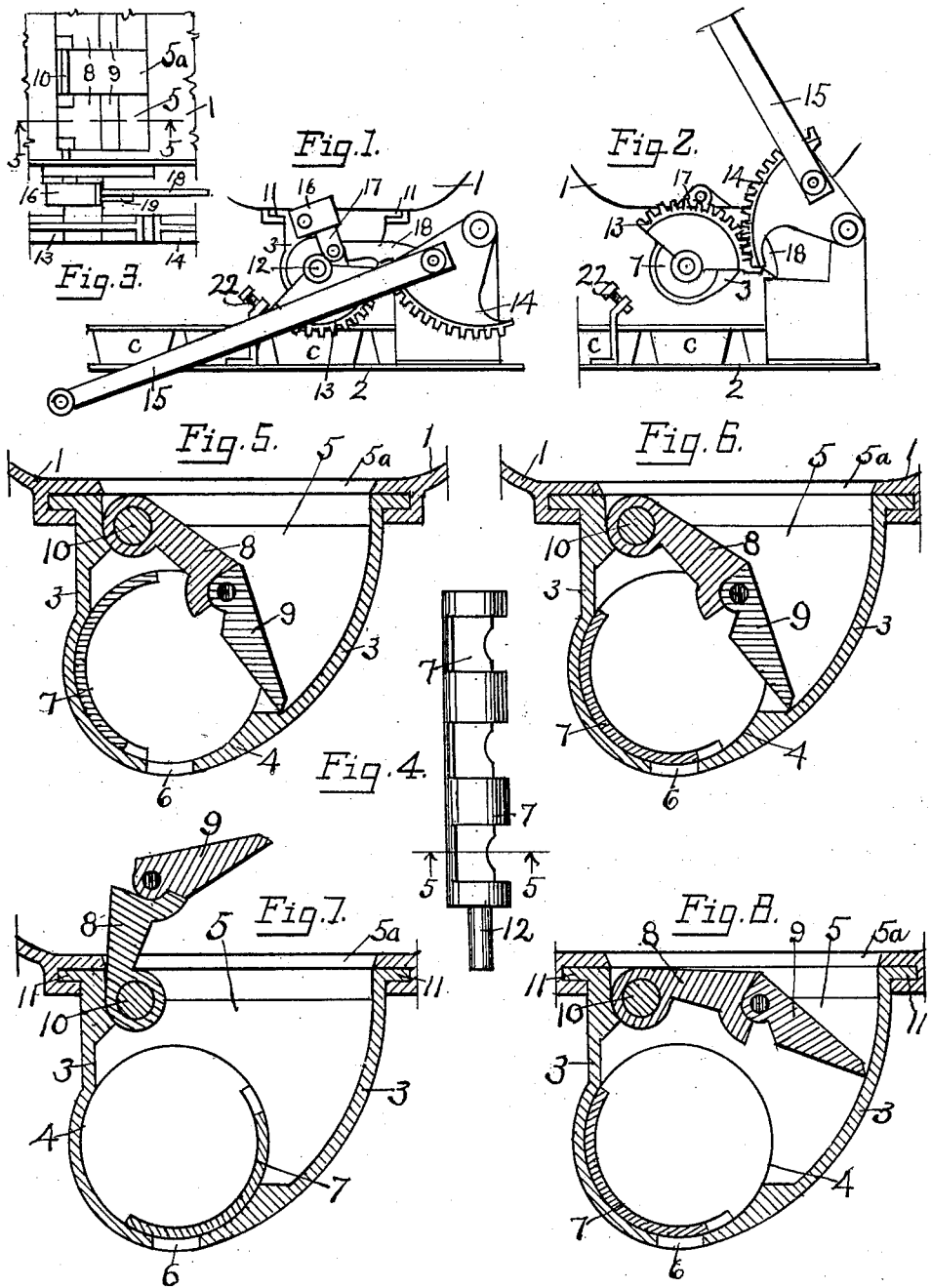

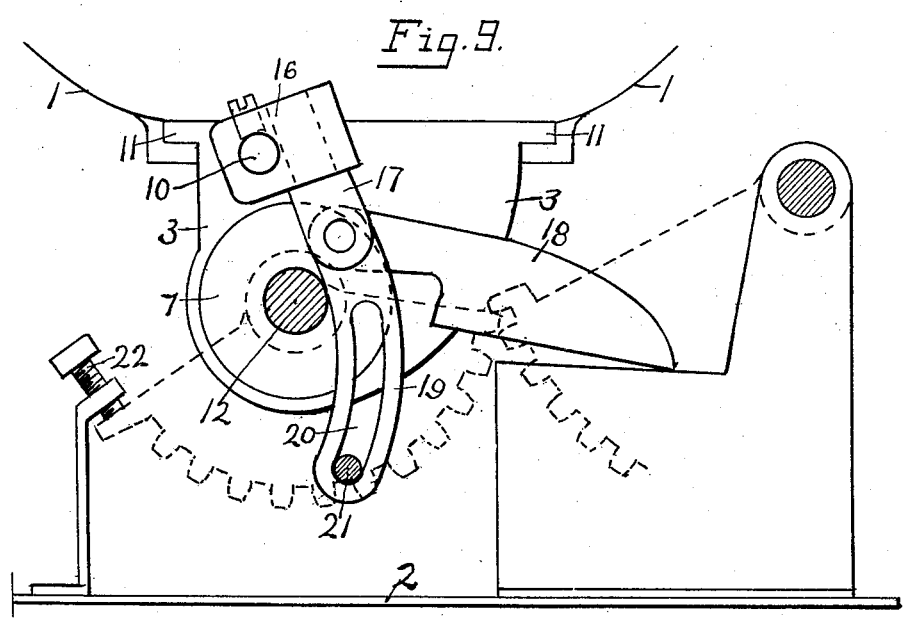
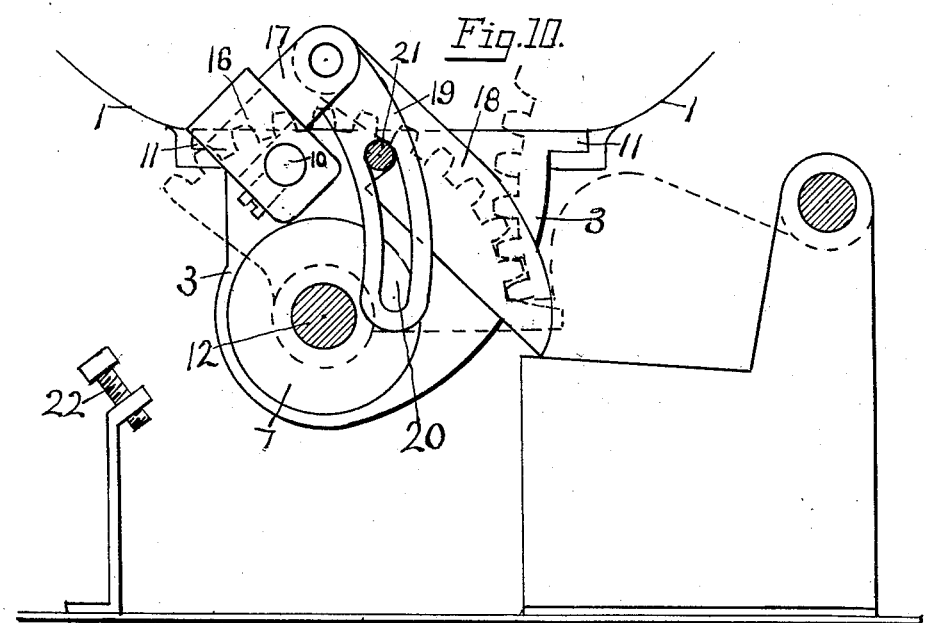

1,866,589

UNITED STATES PATENT OFFICE

ERNEST A. ADAMS, OF TACOMA, WASHINGTON, ASSIGNOR TO MARTIN HELLAND, OF TACOMA, WASHINGTON

CUP CAKE DROPPING MACHINE

Application filed October 31, 1930. Serial No. 492,566.

My invention pertains to an improvement in a cup cake dropping machine, invented by Martin Helland, of Tacoma, Pierce County, Washington, for which he on January 18, 1930, filed an application for Letters Patent in the United States, the Serial Number being 421,847. It has been found that the Helland invention has to be operated at a certain speed and with a carefully adjusted pressure on the dough to secure an equal discharge of dough at each consecutive operation of the rotary valves, and further, should the valves be left open at any time, the dough would waste out through the same.

My invention pertains to improvements in the rotating valves in the Martin Helland invention. The object of my invention is to provide a rotating valve that will receive the dough or batter from the dough container, by means of suction instead of by pressure, and at the same time receive and discharge an equal and uniform quantity of dough at each operation, and when the machine is left standing inoperative, the valves will be so closed that no dough will leak out and be wasted through the same.

I attain these objects by means of the mechanism illustrated in the accompanying drawings, in which—

Figure 1 is an external end view of my invention showing the operative mechanism at the finish of filling a set of cup cake pans; Fig. 2 is the same as Fig. 1 showing the operating mechanism at the beginning of filling a set of cup cake pans; Fig. 3 is a partial top view of Fig. 1; Fig. 4 is a top view of the cylindrical measuring and cutting device detached from Fig. 1 and is practically the same as used in the Helland invention; Fig. 5 is an enlarged vertical section through the rotating valve gate and the cylindrical cutting device on the line 5—5, of Fig. 3 as at the finish of filling a cup cake pan; Fig. 6 is the same as Fig. 5, but at the finish of closing the outlet after filling a cup cake pan; Fig. 7 shows the rotating valve gate open preparatory to securing another supply of dough for filling a cup cake pan; Fig. 8 shows the rotating valve gate closed to a point of rest till the outlet port is opened for discharge of dough into the cup cake pan; Fig. 9 is an enlarged view of Fig. 1 with the operating mechanism exposed to view; and Fig. 10 is a like view of Fig. 2.

Similar characters designate similar parts in the several views.

My invention is designed to be attached to the flat bottom of any form of a dough container partially shown at 1, the same being supported on a base 2, similar to the Helland invention. My improvement comprises an attachable and detachable valve chamber 3 designed with a cylindrical opening 4 the full length thereof. One side of the chamber is made segmental and upwardly inclined to an intake opening 5 at the top for each valve and with an outlet port 6 at the bottom of each, quite like the same in the Helland invention, but with one large opening 5a in the bottom of the dough container 1 through which dough is supplied to the group of valve intakes 5. The cylindrical opening 4 is designed to receive the measuring and cutting device 7 to be neatly fitted therein and operated with a rotary oscillating movement by a mechanism hereinafter described.

My valve improvement comprises a swinging gate composed of two members 8 and 9 hinged together at a central point. The gate is hung on a hinge rod 10 at one side of the valve chamber 3 with its center in alinement with the top of the intake opening 5 of each valve chamber. Each gate with its members 8 and 9 opened out straight will neatly fit its respective opening 5 and will neatly contact the segmental side of the chamber 3 as it swings downwardly into the same, as shown in Figs. 5, 6 and 8. When the gate is swung upward, the dough acting thereon, will cause the two members to partly swing together forming an elbow shape as seen in Fig. 7.

It will be seen the valve chamber 3 is attachable and detachable to the dough container 1 by means of side flanges 11 neatly milled to slidably fit into grooves cast and milled on the bottom of the dough container to receive the same. By this means the valve chamber 3 can be detached from the container 1 for cleaning and the cutting device 7 can likewise be detached from the chamber 3 to be separately washed and cleaned.

The improved cup cake measuring and cutting device as now shown and described, is now ready for operation. The operating mechanism for the valve will be described by referring to the several figures of the drawings. On the end shaft 12 of the cylindrical cutting device 7 is mounted a segmental gear 13 with a supplemental segmental gear 14 intermeshed therewith as shown in Figs. 1 and 2. A hand crank arm 15 fixed on gear 14 provides a means for rotating the gears to and fro and the cylindrical cutting device 7 therewith. On the adjacent end of the hinge rod 10 is fixed an operative block 16 from which extends a side member 17 fixed thereto. In the end of this extending member is pivotally attached a dog 18 and a companion segmental member 19 with a segmental slot 20 therein. A stud 21 fixed in the rear side of gear 13 extends through slot 20 and far enough beyond to engage the dog 18, all of which will be seen by referring to Figs. 9 and 10.

Referring to Figs. 1, 9 and 5, it is to be observed that the position shown is at the finish of filling a set of cup cake pans $c$. The discharge port 6 is open and the swinging valve gate composed of the members 8 and 9 is rotated down to the limit in its downward movement. The required amount of dough has been discharged through the outlet 6 and it is now in order to reverse the rotating movement preparatory to filling another set of cup cake pans. As the crank handle is lifted up the gear 13 will be turned to the left and the cylindrical cutting device 7 with it, thus closing the port 6 and neatly cutting the dough dropping into the cup cake pans. At the closing of the port 6, the stud 21 after idling along the segmental slot 20 will contact with the upper end wall of the slot and lift the double hinged valve gate to the position shown in Fig. 7. The pressure of the dough and the suction of the individual valve chamber will cause the valve gate to assume the elbow shape and thus allow the dough to suck down around the same and fill the valve chamber.

The position of the operating mechanism is now as shown in Figs. 2 and 10 and ready for the downward movement to fill another set of cup cake pans. The dog member 18 has gravitated into engagement with the stud 21 and with the downward movement of the crank 15, the valve gates will rotate down to the position shown in Fig. 8 when it will slide out of engagement. The ports 6 are still closed and the gates will rest at this point till the stud 21 contacts the lower end of the slot 20, when the ports 6 will have been opened and the stud will now draw the valve gates to the first and finished position as shown in Fig. 5, thus pushing out the dough and filling another set of cup cake pans.

It will now be seen that the cylindrical cutting device 7 rotated in unison with the double hinged valve gate as shown and described, will measure and deliver an exact and uniform quantity of dough into each set of cup cake pans. The batter dough is fed into the valve chambers wholly by gravity and suction, and the need of a dough pressing mechanism is eliminated. The valves can be operated at a slow or fast speed and the result as to quantity will always be the same. There is no possibility of leakage or waste at any time or in any position, should the machine be left standing idle.

A hopper or bowl shaped dough container with a flat bottom part is preferred to a rectangular form in the use of my invention. It is to be noted that the companion segmental gears 13 and 14 are designed to stabilize the machine and prevent toppling. They are particularly essential in small machines. In large heavy machines, they may be dispensed with and a segmental disk to which the crank 15 is attached, for operating the machine, substituted therefor I reserve the right to use either means of operating the machine.

It is to be observed that the individual valves may be varied in size and in number in their application to the dough container. The valve may be enlarged and used singly in filling small cake pans for baking loaf cakes.

My invention as now shown and described has been tested and proven to operate perfectly and the object desired has been attained. It is a positive improvement over the Helland machine and is more economical and practical in that it eliminates the dough pressing part of his invention.

It is to be noted that the amount of dough to be discharged at each operation can be varied and regulated by the adjustable threaded screw stop 22 which screw limits the movement of the gear 13.

The Figs. 9 and 10 are made on a plane of the rear faces of the companion segmental gears 13 and 14 and show the mechanism immediately back of same.

Having described my invention, I claim:—

1. A cup-cake dropping machine including a valve container attached below a bottom outlet from a dough container, said valve container having a plurality of cylindrical oscillatory valves therein, intermittent means for gathering and discharging dough from said container through said oscillatory valves, said means comprising a side hinged valve gate operated to fill the chambers of said oscillatory valves and provide the pressure to discharge the dough therefrom, and said valve gate composed of two parts hinged together near the center to facilitate its operation in the dough.

2. A cup-cake dropping machine including a valve container attached below a bottom discharge port from a dough container, said valve container having a plurality of cylindrical oscillatory valves, therein, means for opening and closing the discharge port being a part of said oscillatory valves, a double hinged valve gate operated to fill the chambers of said valves and provide the pressure to discharge the dough therefrom, and mechanical means for operating said valve gate in proper accord with the opening and closing of the discharge port of said rotary valves.

3. A cup-cake dropping machine including a valve container made attachable and detachable below the bottom discharge port of a dough container, said valve container having a plurality of cylindrical oscillatory valves therein, means for opening and closing the discharge ports being a part of said oscillatory valves, a double hinged valve gate operated to fill the chambers of said valves and provide a pressure to discharge the dough therefrom, mechanical means for operating said valve gate in proper accord with the opening and closing of the discharge port of said oscillatory valves, and means for limiting the operation of said mechanical means whereby an exact and uniform quantity will be discharged at each operation of said valves.

4. A cup-cake dropping machine including a valve container attached below the bottom discharge port from a dough container, said valve container having a plurality of cylindrical oscillatory valves therein, means for opening and closing the discharge port being a part of said oscillatory valves, a double hinged valve gate operated to fill the chambers of said oscillatory valves and provide the pressure to discharge the dough therefrom, and means for operating said valve gate in proper accord with the opening and closing the discharge port of said oscillatory valves, said operating means including a toothed member carried by said opening and closing means, an operating toothed member engaged with the first toothed member, and means on said valve gate operatively engaged with said first toothed member.

5. In a cup-cake dropping machine, a dough discharging mechanism for the outlet of a dough container comprising a valve container attached below said outlet and having an outlet, chambered valves in said valve container, a combined dough cutter and closure for said valve container outlet, a double hinged valve gate for filling the chambers of the valves and providing the pressure for discharging the dough therethrough, a toothed segment on the axis of said cutter, a link on the axis of the valve gate, means on said segment operatively engaged with said link, an operating toothed segment engaged with the first segment, and means for operating the said second segment.

6. In a cup-cake dropping machine, a dough discharging mechanism for the outlet of a dough container comprising a valve container attached below said outlet and having an outlet, chambered valves in the valve container, a combined dough cutter and closure for the said valve container outlet, a double hinged valve gate for filling said chambers of the valves and providing the pressure for discharging the dough therethrough, a toothed segment on the axis of said cutter, a slotted link on the axis of the valve gate, a pin on said segment engaged in the slot of said link for operating said valve gate, an operating toothed segment engaged with the first segment, and means for operating said second segment.

7. In a cup-cake dropping machine, a dough discharging mechanism for the outlet of a dough container comprising a valve container attached below said outlet and having an outlet, oscillatory chambered valves in said valve container, a combined dough cutter and closure for the valve container outlet, a double hinged valve gate for filling the chambers of the oscillatory valves and providing the pressure for discharging the dough therethrough, a toothed segment on the axis of the cutter, a slotted link on the axis of said valve gate, a pin on said segment engaged in the slot of said link for moving the gate in one direction, a notched arm carried by said link for engagement by said pin for moving the valve gate in the opposite direction, a toothed segment engaged with the first segment for operating the latter, and means for operating the second segment.

ERNEST A. ADAMS.